United States Patent [19]

Kremer

[11] 4,247,199
[45] Jan. 27, 1981

[54] FRAME FOR PARTIAL ILLUMINATION IN PHOTOCOPYING OF NEGATIVES, DIAPOSITIVES AND THE LIKE

[75] Inventor: Walter Kremer, Bergneustadt, Fed. Rep. of Germany

[73] Assignee: Firma Johannes Bockemühl, Gummersbach, Fed. Rep. of Germany

[21] Appl. No.: 60,847

[22] Filed: Jul. 26, 1979

[30] Foreign Application Priority Data

Jul. 31, 1978 [DE] Fed. Rep. of Germany ... 7822903[U]

[51] Int. Cl.³ .............................................. G03B 27/58
[52] U.S. Cl. ....................................... 355/72; 355/44; 355/55
[58] Field of Search ............................. 355/75, 40–43, 355/55, 72, 44

[56] References Cited

U.S. PATENT DOCUMENTS 3,295,408  1/1967  Rab ........................................ 355/44
4,165,934  8/1979  Zimmet ................................. 355/55

Primary Examiner—Richard A. Wintercorn
Attorney, Agent, or Firm—Michael J. Striker

[57] ABSTRACT

A frame for partial illumination in copying of negatives, diapositives and the like onto a copying paper, has a paper-receiving plate with a paper supporting face, a cover plate alternatively positionable onto and withdrawable from the paper-receiving plate, and a member located adjacent to the paper-receiving plate and forming a focusing face at the height of the paper-supporting face. The member may be attached to the paper-supporting plate or to the cover plate. It may be formed as an actuating member of a paper-lifting device.

10 Claims, 2 Drawing Figures

FRAME FOR PARTIAL ILLUMINATION IN PHOTOCOPYING OF NEGATIVES, DIAPOSITIVES AND THE LIKE

BACKGROUND OF THE INVENTION

The present invention relates to a frame for partial illumination in photographic copying of negatives, diapositives and the like onto a copying paper.

Partial illuminating frames for such purposes are known in the art. A known partial illumination frame has a paper-receiving plate with a cover plate which lies on the paper-receiving plate and is operatively withdrawable from the latter. In the process of illumination of a partial face of a partial illumination frame, the copying paper is inserted into the frame and the paper-receiving plate is closed by the cover plate, whereafter an enlargement device is adjusted for focused projection. The focusing position is obtained on the upper face of the cover plate which is initially in the closed position, that is above the plane of the paper-receiving face of the frame. Thereby, a height differential takes place between the focusing plane and the paper-receiving face, which height differential corresponds to the thickness of the cover plate and leads to sharpness or focusing losses. This cannot be avoided even in the cases when the cover plate has a small thickness.

In another known partial illumination frame height adjustment is utilized, wherein the vertical position of the copying paper lying on the paper-receiving plate is taken into consideration, and the observe face of the enlargement device is adjusted relative to the same. The focus adjustment is performed here by an additional part which must be continuously exchanged relative to the partial illumination frame, whereby it can be misplaced or must be searched in darkness.

SUMMARY OF THE INVENTION

Accordingly, it is an object of the present invention to provide a frame for partial illumination which avoids the disadvantages of the prior art.

More particularly, it is an object of the present invention to provide a frame for partial illumination, which allows a fast, convenient and accurate focusing of an enlarging device.

In keeping with these objects and with others which will become apparent hereinafter, one feature of the present invention resides, briefly stated, in a partial illuminating frame which has a member peripherally overlapping a paper-receiving plate and having a focusing face. In such a construction, the part defining the focusing face and the parts defining the partially illuminating frame, together form a unit which can be conveniently moved by a user in one stroke to focusing position under the enlargement device. There are no loose parts to be manipulated with. The above-mentioned member is advantageously mounted on a peripheral frame portion of the paper-receiving plate and forms simultaneously a holding face for positioning of the partial illumination frame.

In accordance with a further feature of the present invention, easier focusing is attained when the member is formed in lateral extension of a cover plate of the frame, so that its focusing face is offset relative to the outer face of the cover plate by the thickness of the latter. It is important that the focusing face must be located at a height corresponding to the height of the copying paper.

An especially advantageous feature of the present invention is that the member may be formed as an actuating member of a paper-removing device which later is described, for example, in the German Design Pat. No. 7,737,118. The actuating member in this case performs an additional function of forming the focusing face for the projecting part in the required vertical position. Advantageously, the member extends over the entire length of a lateral side of the frame or the paper-receiving plate of the latter, whereas the focusing face extends only over a part of the length of the member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
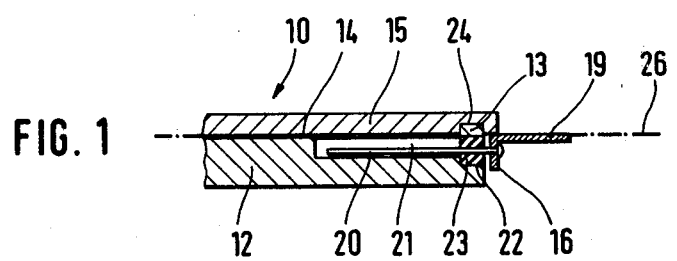
FIG. 1 is a view showing a section of a fragment of a partial illumination frame in accordance with the present invention, with a closed cover plate and an inventive member.

A frame for partial illumination, in accordance with the present invention, is identified in toto by reference numeral 10. It comprises a rectangular paper-receiving plate 11 with a peripheral frame portion 12 which has bar-shaped peripheral limiting elements 13. The latter extend normal to the paper receiving plate 11 and serves for lateral fixation of copying paper 14 in correspondence with the format of the latter.

The frame 10 further comprises a cover plate 15 which lies on the paper-receiving plate 11 and may be composed of a plurality of individual plates assembled with each other. The cover plate 15 can be positioned onto and withdrawn from the plate 11. The peripheral frame portion 12 is overlapped in the region of its edge, by a member 16 which is arranged in the illustrated embodiment on a side face of the peripheral frame portion 12. Thus, the member 16 is located laterally adjacent to the paper-receiving plate 11. The member 16 has an upper focusing face 17 which is suitable, with regard to its upper surface characteristics, for catching of the picture to be projected. This upper focusing face 17 lies in a horizontal plane in which the paper sheet to be illuminated lies, and simultaneously forms a holding face 18 which allows a convenient and fast handling of the partial illumination frame 10. The coordinated location of the focusing plane 17 and the paper sheet to be illuminated is shown in FIG. 1 by a dot-and-dash line 26.

The member 16 may also be attached to the cover plate 15 when this is simpler on the manufacturing grounds. It must be, however, mentioned that the focusing plane 17 must be located exactly in the plane of the paper sheet to be illuminated. In this not shown variant, such a location is attained by the focusing plane 17 of the member 16 being displaced relative to the outer face of the cover plate 15 by its thickness.

The clean or white focusing face 17 may be protected from dirtying during handling or by photochemicals in a simple way by a protective coating formed, for example, of a self-sticking foil. The region of the member 16 located on the other side of the focusing face 17 is also available for handling.

Especially fast engagement and withdrawal of the relatively thin flatly lying copying paper 14 is also possible in darkness, when the member 16, as shown here, is simultaneously formed as an actuating member of a known removing element 19 for the copying paper. As can be seen from FIG. 1, the member 16 is right-angled. The focusing face 17 is formed upwardly on the horizontal leg of the element 16 in the plane of the paper-receiving face. The vertical leg of the removing element 19 has a lifting arms 20 for the copying paper 14, which lie normal inside the peripheral frame portion 12 below the plane of the paper-receiving plate 11 in recesses 21. The arms 20 of the removing element 19 are supported in slots 22 by elastic packing members 23, for example of rubber. The latter serve simultaneously as return springs for the removing element 19. The light tightness is increased by inner grooves 24 in the cover plate 15, which overlap the limiting elements 13 of the peripheral frame portion 12.

The dimensions of the peripheral frame portion 12 determine the maximum format of the copying paper. When copying paper of a smaller format must be utilized in such a frame or in the same frame 10, sinkable or exchangeable members 25 may be provided in the paper-receiving plate 11, which corresponds to the desired format. The paper-receiving plate 11 may also be provided at one or both sides with limiting elements for fixation of a smaller format, and the plate must be turned for handling of such limiting elements.

Figure 2:
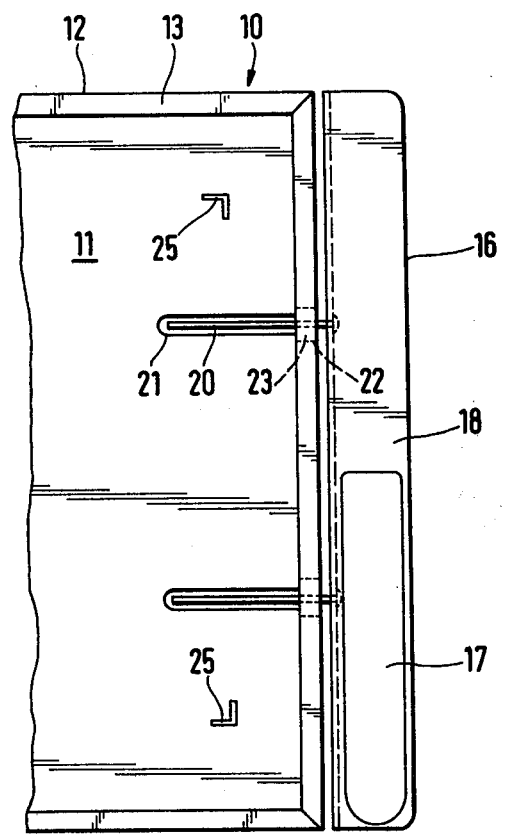
FIG. 2 is a plan view of the partial illuminating frame of FIG. 1 with the removed cover plate.

In the partial illumination frame shown in FIGS. 1 and 2, the member 16 with its focusing face performs simultaneously two functions. On the one hand, it provides a reliable focusing position before the process of illuminating, and its construction as holding face allows a simple handling of the frame. On the other hand, after the illumination it serves as a removing element for the copying paper. When several enlargements of the same format must be produced from one negative, the copying paper can be fast exchanged.

It will be understood that each of the elements described above, or two or more together, may also find a useful application in other types of constructions differing from the types described above.

While the invention has been illustrated and described as embodied in a frame for partial illumination, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A frame for partial illumination in photographic copying from negatives, diapositives and the like associated with an illuminating device, onto a copying paper, the frame comprising a paper-receiving plate forming a paper-supporting face onto which a copying paper is placed, said paper-supporting face being located at a predetermined height; a transparent cover plate movable relative to said paper-receiving plate between a closed position in which it is placed onto the copying paper received in said paper-receiving plate, and an open position in which it is withdrawn from said paper-receiving plate; and a member mounted on a peripheral portion of one of said plates laterally adjacent to and substantially coplanar with said one plate so as to form together a unit, said member forming a focusing face located at the height of said paper-supporting face of said paper-receiving plate and simultaneously forming a holding face to be held by a user, so that when the copying paper is received in said paper-receiving plate and said cover plate is placed onto the copying paper the illuminating device can be focus-adjusted by focusing onto said focusing face of said member without damaging the copying paper, whereafter said one plate can be displaced by said holding face so as to place the copying paper accommodated between said plates into the region of illumination of the illuminating device.

2. A frame as defined in claim 1, wherein said paper-receiving plate has a peripheral region, said member being mounted on and overlaping said paper-receiving plate at the side of said peripheral region.

3. A frame as defined in claim 1, wherein said member is mounted on said cover plate.

4. A frame as defined in claim 3, wherein said cover plate has an outer surface and is of a predetermined thickness, said focusing face of said member being spaced from said outer surface of said cover plate by a distance corresponding to the thickness of the latter.

5. A frame as defined in claim 1; and further comprising a lifting device having an actuating element, said member being formed as the actuating element of said lifting device.

6. A frame as defined in claim 5, wherein said paper-receiving plate has a recess, said lifting device having an arm which extends into said recess of said paper-receiving plate.

7. A frame as defined in claim 1, wherein said paper-receiving plate has a lateral side of a predetermined length, said member extending over the entire length of said lateral side of said paper-receiving plate.

8. A frame as defined in claim 7, wherein said member has a predetermined length, said focusing face of said member extending over a part of the length of said member.

9. A frame as defined in claim 1; and further comprising means for fixing paper of differing formats.

10. A frame as defined in claim 9, wherein said fixing means includes at least one sinkable abutment member arranged on said paper-receiving plate.

* * * * *